(12) United States Patent
Endo et al.

(10) Patent No.: US 11,356,187 B2
(45) Date of Patent: Jun. 7, 2022

(54) MOBILE TERMINAL TESTING DEVICE AND MOBILE TERMINAL TESTING METHOD

(71) Applicant: ANRITSU CORPORATION, Kanagawa (JP)

(72) Inventors: Hideyuki Endo, Kanagawa (JP); Hironori Watanabe, Kanagawa (JP); Takumi Nakamura, Kanagawa (JP); Yui Yoshida, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/357,384

(22) Filed: Jun. 24, 2021

(65) Prior Publication Data

US 2022/0038197 A1 Feb. 3, 2022

(30) Foreign Application Priority Data

Jul. 28, 2020 (JP) .............................. JP2020-127072

(51) Int. Cl.
*H04B 17/391* (2015.01)

(52) U.S. Cl.
CPC .............................. *H04B 17/3912* (2015.01)

(58) Field of Classification Search
CPC ................................................ H04B 17/3912
See application file for complete search history.

(56) References Cited

U.S. PATENT DOCUMENTS

2005/0176375 A1* 8/2005 Bednasz ................ H04B 17/29
455/67.11

OTHER PUBLICATIONS

3GPP Technical Specifications, Chapter 38521-2, V16.7.0 (Mar. 2021), Release 16, Section K.1.4, "Peak EIS Measurement Procedure".

* cited by examiner

*Primary Examiner* — Natasha W Cosme
(74) *Attorney, Agent, or Firm* — Pearne & Gordon LLP

(57) ABSTRACT

A measuring device 1 performs control to perform a reception sensitivity test of measuring a throughput of a signal under measurement, and repeating the measurement while changing an output level of a test signal at each measurement position corresponding to a plurality of orientations. The integrated control device 10 that performs the control includes a measurement situation display control unit 18d that displays a measurement progress display screen having a first display area for displaying a result of the reception sensitivity test up to the measurement position where the reception sensitivity test is completed, and a second display area for displaying a progress situation of the measurement of the reception sensitivity test at the measurement position at which the reception sensitivity test is started.

7 Claims, 10 Drawing Sheets

MOBILE TERMINAL TESTING DEVICE AND MOBILE TERMINAL TESTING METHOD

TECHNICAL FIELD

The present invention relates to a mobile terminal testing device and a mobile terminal testing method for performing a reception sensitivity test of measuring reception sensitivity by causing a device under test to receive a test signal a plurality of times and performing a test on a mobile terminal which is the device under test.

BACKGROUND ART

For a wireless terminal that is developed in recent years and transmits and receives a radio signal corresponding to IEEE802.11ad, 5G cellular, and the like, in which a wideband signal in a millimeter wave band is used, a performance test is performed for measuring an output level and reception sensitivity of a transmitted radio wave determined for each communication standard with respect to a wireless communication antenna included in the wireless terminal, and judging whether or not a predetermined reference is satisfied.

For example, in a performance test in which a wireless terminal for a 5G New Radio (NR) system (hereinafter, referred to as a 5G wireless terminal) is used as a Device Under Test (DUT), an OTA test is performed using a radio anechoic box (OTA chamber) called a Compact Antenna Test Range (CATR) which is not affected by a surrounding radio wave environment.

For various tests under the OTA environment targeting the 5G wireless terminal, for example, it is obligated to perform a test in accordance with the standards described in the specifications of 3rd Generation Partnership Project (3GPP) (Non-Patent Document 1).

For example, for equivalent isotropic sensitivity (EIS) measurement of a DUT that is rotated so as to sequentially face all orientations of a spherical coordinate system under the OTA environment, chapter 38521-2K.1.4 of 3GPP describes definition of "search for a beam peak direction of a received signal and spherical coverage in EIS". Also, chapter 38521-2K.1.6 of 3GPP describes EIS-cumulative distribution function (CDF) measurement.

RELATED ART DOCUMENT

Patent Document

[Non-Patent Document 1] 3GPP Technical Specifications Chapter 38521-2k.1.4/Chapter 38521-2k.1.6

DISCLOSURE OF THE INVENTION

For the "search in the beam peak direction of the received signal and the spherical coverage in EIS (an area ratio of a part reaching a required radiant power)" defined in 3GPP NR standards, averaged EIS (cumulative distribution of EIS) at each measurement position ($\theta$, $\varphi$) on a spherical surface is required as a measurement result.

In order to obtain the cumulative distribution of EIS (EIS-CDF), a throughput indicating a data transfer rate is repeatedly measured while changing an output level of a test signal at each of $\theta$ polarization and $\theta$ polarization for each measurement position.

For a function of displaying a progress situation of the measurement, a mobile terminal testing device corresponding to EIS-CDF measurement according to the related art displays the measurement result (EIS (Total)) at a timing in which the EIS measurement is completed at the measurement position in association with an index number indicating an order of the measurement, for each measurement position. On the other hand, this type of mobile terminal testing device according to the related art does not have a function of displaying the progress situation of the EIS measurement at each measurement position.

That is, in the mobile terminal testing device according to the related art, it is possible to grasp the measurement position to which the EIS measurement is progressed based on the index number on a display screen for displaying the progress situation of the measurement, but it is not possible to grasp the progress situation related to the EIS measurement at each measurement position.

The EIS measurement is a search for the output level of the test signal that can be normally received by the DUT, and is a type of measurement performed in a reception sensitivity test. Multiple test signals are obtained. Since it is essential to transmit the test signal a plurality of times while changing the output level, the measurement takes a long time. In the mobile terminal testing device according to the related art that does not have a function of displaying the progress situation of the EIS measurement during the EIS-CDF measurement, the progress situation of the EIS measurement is not known, so that it is not basically possible to determine whether a measurement operation is performed and it is unclear whether a test is progressing normally. Therefore, there are problems in that, in a case where the progress is abnormal, it is not possible to find a cause or to ascertain whether or not to perform a test again and it is difficult to estimate a test time.

Problem that the Invention is to Solve

The present invention has been made to solve the problems according to the related art, and an object of the present invention is to provide a mobile terminal testing device and a mobile terminal testing method that can confirm a progress situation of a reception sensitivity test performed at each of a plurality of measurement positions as in EIS-CDF measurement, eliminate uncertainties related to the progress of the measurement, find a cause or ascertain whether or not to perform a test again in a case where the progress is abnormal, and estimate a test time.

Means for Solving the Problem

In order to solve the above problems, according to a first aspect of the present invention, there is provided a mobile terminal testing device including: a positioner (56) that rotates a mobile terminal (100) which is a device under test to sequentially face a plurality of preset orientations of a spherical coordinate system; a simulation measurement device (20) that is connected to a test antenna; measurement control means (10) for controlling the simulation measurement device to perform, at each measurement position corresponding to the plurality of orientations, a reception sensitivity test for transmitting a test signal from the test antenna to the mobile terminal in accordance with rotation of the positioner, receiving a signal under measurement transmitted from the mobile terminal which has received the test signal by the test antenna, measuring a throughput based on the signal under measurement, and repeating the measurement of the throughput while changing an output level of the test signal; and display control means (18*d*) for displaying, in accordance with a progress of the reception sensitivity test at each measurement position, a measurement progress display screen (13a) having a first display area (13c) for displaying a result of the reception sensitivity test up to the measurement position where the reception sensitivity test is completed, and a second display area (13d) for displaying a measurement progress situation of the reception sensitivity test at the measurement position where the reception sensitivity test is started.

With the configuration, in the mobile terminal testing device according to the first aspect of the present invention, it is possible to grasp the progress situation of the reception sensitivity test, which indicates a signal level that can be normally received by the device under test during the reception sensitivity test at each measurement position from display content of the second display area. As a result, it is possible to confirm the progress situation of the measurement in the reception sensitivity test for each of a plurality of measurement positions such as the EIS-CDF measurement, and it is possible to eliminate uncertainty related to the progress of the measurement. Furthermore, it is possible to find a cause or ascertain whether or not to perform a test again in a case where abnormality occurs, so that it is possible to estimate a test time.

Further, in the mobile terminal testing device according to a second aspect of the present invention, the second display area may include respective items (136, 138, 139) including the output level of the test signal, a measured value of the throughput, and a determination result of whether or not the measured value exceeds a threshold value, as display items, and the display control means may update and display values of the respective items in the second display area in accordance with the progress of the reception sensitivity test.

With the configuration, the mobile terminal testing device according to the second aspect of the present invention can easily confirm the output level of the test signal displayed in the second display area during the reception sensitivity test related to the equivalent isotropic sensitivity measurement at each measurement position, the measured value of the throughput, and the determination result of whether or not the measured value of the throughput exceeds a threshold value.

Further, in the mobile terminal testing device according to a third aspect of the present invention, the first display area may include a rotation angle of the positioner corresponding to a plurality of the measurement positions and the result of the reception sensitivity test at the measurement position, as display items (131, 132, 133), and the display control means may display, as the result of the reception sensitivity test, an output level of the test signal immediately before the output level of the test signal which is displayed in the second display area and is determined that a measured value of the throughput exceeds a threshold value.

With the configuration, the mobile terminal testing device according to the third aspect of the present invention can continuously confirm the measurement progress situation from the display content of each item in the second display area until the mobile terminal cannot receive the test signal having the lower output level during the reception sensitivity test related to the equivalent isotropic sensitivity measurement at each measurement position.

Further, in the mobile terminal testing device according to a fourth aspect of the present invention, the test signal may be any of linear polarizations orthogonal to each other, the plurality of orientations may be all orientations which are necessary to calculate a cumulative distribution function (CDF) of an equivalent isotropic sensitivity (EIS) of the mobile terminal, the first display area may include a rotation angle of the positioner corresponding to the measurement position of a measurement target of cumulative distribution measurement and the equivalent isotropic sensitivity at the measurement position as display items (131, 132, 133), and the equivalent isotropic sensitivity may be displayed as a result of the reception sensitivity test in the first display area.

With the configuration, the mobile terminal testing device according to the fourth aspect of the present invention can confirm the progress situation of CDF measurement for each measurement position in EIS measurement.

Further, in the mobile terminal testing device according to a fifth aspect of the present invention, the second display area may further display an item which indicates the test signal included in any of the linear polarizations orthogonal to each other.

With the configuration, the mobile terminal testing device according to the fifth aspect of the present invention can confirm the progress situation of the CDF measurement for each measurement position in the EIS measurement, for example, for any of the $\theta$ polarization and the $\varphi$ polarization as linearly polarizations orthogonal to each other.

Further, the mobile terminal testing device according to a sixth aspect of the present invention may further include a radio anechoic box including an internal space, in which the positioner and the test antenna may be provided in the internal space.

Further, in order to solve the above problem, according to a seventh aspect of the present invention, there is provided a mobile terminal testing method of a mobile terminal testing device including a positioner (56) that rotates a mobile terminal (100) which is a device under test to sequentially face a plurality of preset orientations of a spherical coordinate system, a simulation measurement device (20) that is connected to a test antenna (5), and a measurement control means (10) for controlling the simulation measurement device to perform, at each measurement position corresponding to the plurality of orientations, a reception sensitivity test for transmitting a test signal from the test antenna to the mobile terminal in accordance with rotation of the positioner, receiving a signal under measurement transmitted from the mobile terminal which has received the test signal by the test antenna, measuring a throughput based on the signal under measurement, and repeating the measurement of the throughput while changing an output level of the test signal, the mobile terminal testing method including: an initial screen display control step (S3) of displaying, in accordance with a start of the reception sensitivity test at each measurement position, an initial screen of a measurement progress display screen (13a) having a first display area (13c) for displaying a result of the reception sensitivity test up to the measurement position where the reception sensitivity test is completed, and a second display area (13d) for displaying a measurement progress situation of the reception sensitivity test at the measurement position where the reception sensitivity test is started; a measurement position situation display step (S48) of displaying the result of the reception sensitivity test up to the measurement position where the reception sensitivity test is completed in the first display area in accordance with the progress of the reception sensitivity test at each measurement position; and a reception sensitivity test situation display step (S43, S45, S46, S47) of displaying the progress situation of the measurement of the reception sensitivity test at the measurement position where the reception sensitivity test is started in the second display area.

With the configuration, in the mobile terminal testing method according to the seventh aspect of the present invention, it is possible to grasp the progress situation of the reception sensitivity test, which indicates a signal level that can be normally received by the device under test during the reception sensitivity test at each measurement position from display content of the second display area. As a result, it is possible to confirm the progress situation of the measurement in the reception sensitivity test for each of a plurality of measurement positions such as the EIS-CDF measurement, and it is possible to eliminate uncertainty related to the progress of the measurement. Furthermore, it is possible to find a cause or ascertain whether or not to perform a test again in a case where abnormality occurs, so that it is possible to estimate a test time.

Advantage of the Invention

According to the present invention, it is possible to provide a mobile terminal testing device and a mobile terminal testing method that can confirm a progress situation of reception sensitivity measurement at each of a plurality of measurement positions, eliminate uncertainties related to the progress of the measurement, find a cause or ascertain whether or not to perform a test again in a case where the progress is abnormal, and estimate a test time.

BRIEF DESCRIPTION OF THE DRAWINGS

FIGS. 5A and 5B are diagrams showing a total spherical scanning image of a DUT in an OTA chamber of the measuring device according to the embodiment of the present invention, in which FIG. 5A shows a disposition mode of the DUT with respect to a center of a spherical coordinate system, and FIG. 5B shows a distribution mode of angular sample points PS in the spherical coordinate system.

BEST MODE FOR CARRYING OUT THE INVENTION

Hereinafter, an embodiment of a mobile terminal testing device according to the present invention and a mobile terminal testing method using the same will be described with reference to the accompanying drawings.

Figure 1:
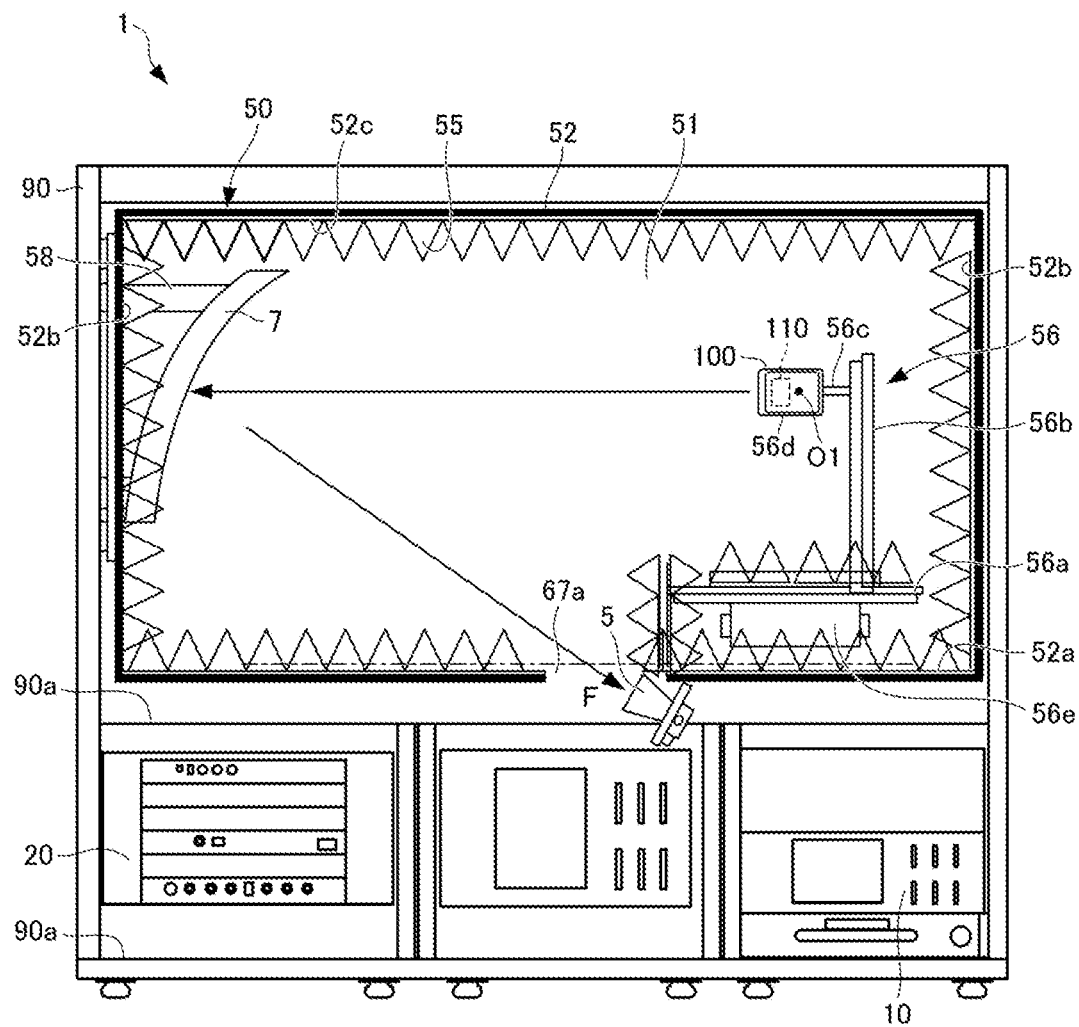
FIG. 1 is a diagram showing a schematic configuration of an entire measuring device according to an embodiment of the present invention.
Figure 2:
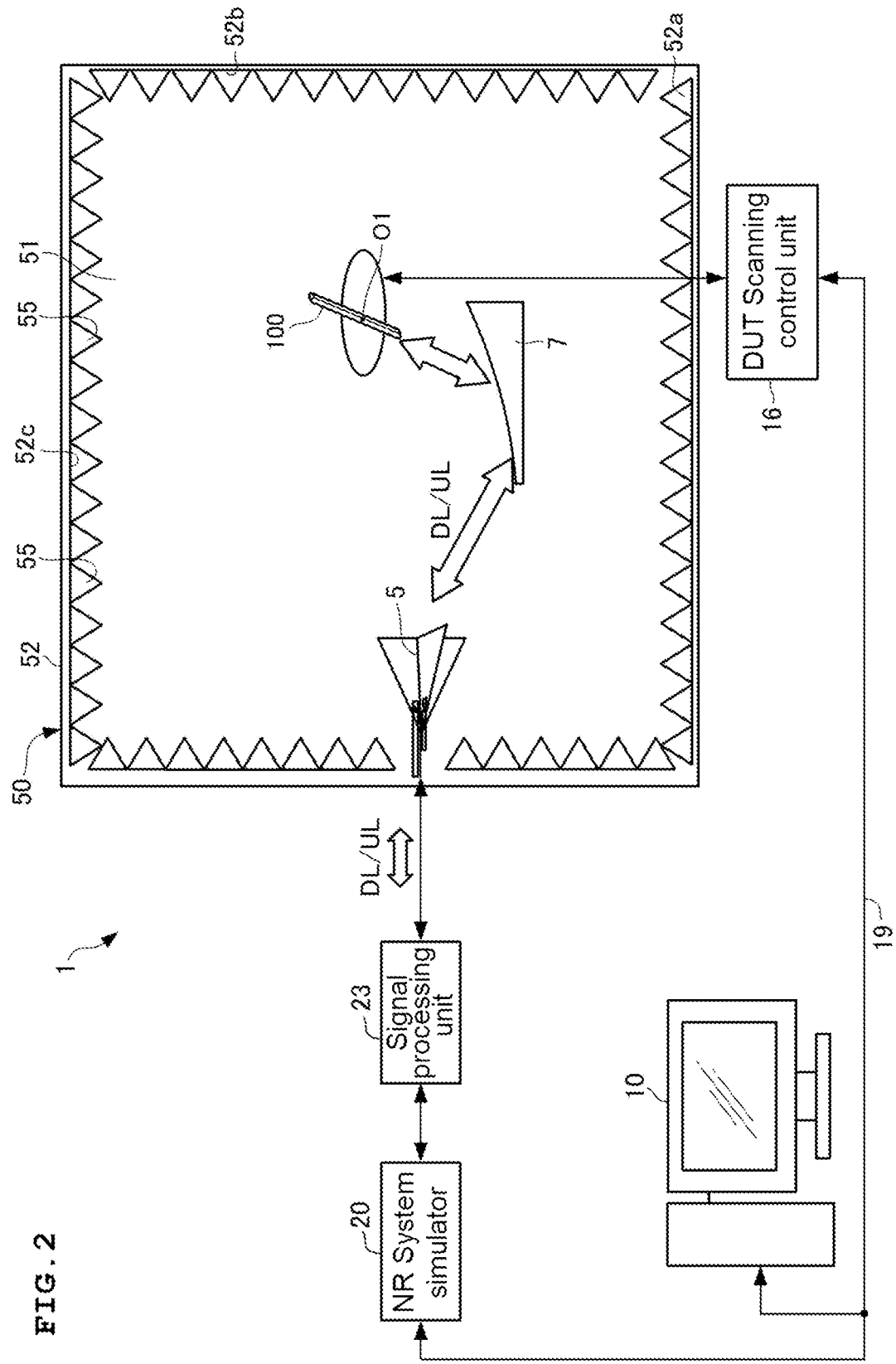
FIG. 2 is a block diagram showing a functional configuration of a measuring device according to the embodiment of the present invention.

First, a configuration of a measuring device 1 according to the embodiment of the present invention will be described with reference to FIGS. 1 to 4. The measuring device 1 constitutes the mobile terminal testing device of the present invention. The measuring device 1 according to the present embodiment has an external structure as shown in FIG. 1 as a whole, and includes functional blocks as shown in FIG. 2. FIGS. 1 and 2 show a disposition mode of each component of an OTA chamber 50 in a state of being seen through from a side surface thereof.

The measuring device 1 is operated, for example, in a mode in which each of the above-described components is mounted on each rack 90a of a rack structure 90 having the structure shown in FIG. 1. FIG. 1 shows an example in which each of an integrated control device 10, an NR system simulator 20, and an OTA chamber 50 is mounted on each rack 90a of the rack structure 90.

As shown in FIG. 2, the measuring device 1 includes the integrated control device 10, the NR system simulator 20, a signal processing unit 23, and the OTA chamber 50.

A configuration of the OTA chamber 50 will be described first. As shown in FIGS. 1 and 2, the OTA chamber 50 includes, for example, a metal housing main body 52 having a rectangular internal space 51, and accommodates a DUT 100 having an antenna 110, a test antenna 5, a reflector 7, and a DUT scanning mechanism 56 in the internal space 51.

A radio wave absorber 55 is attached to a whole area of an inner surface of the OTA chamber 50, that is, a bottom surface 52a, a side surface 52b, and a top surface 52c of the housing main body 52. As a result, the OTA chamber 50 has an enhanced function of suppressing intrusion of radio waves from the outside and radiation of the radio waves to the outside by each element (the DUT 100, the test antenna 5, the reflector 7, and the DUT scanning mechanism 56) disposed in the internal space 51. In this way, the OTA chamber 50 realizes the radio anechoic box having the internal space 51 that is not affected by the surrounding radio wave environment. The radio anechoic box used in the present embodiment is, for example, an Anechoic type.

Among those housed in the internal space 51 of the OTA chamber 50, the DUT 100 is, for example, a wireless terminal such as a smartphone. Communication standards for the DUT 100 include cellular (LTE, LTE-A, W-CDMA (registered trademark), GSM (registered trademark), CDMA 2000, 1×EV-DO, TD-SCDMA, or the like), wireless LAN (IEEE 802.11b/g/a/n/ac/ad, or the like), Bluetooth (registered trademark), GNSS (GPS, Galileo, GLONASS, BeiDou, or the like), FM, and digital broadcasting (DVB-H, ISDB-T, or the like). Further, the DUT 100 may be a wireless terminal that transmits and receives a radio signal in a millimeter wave band corresponding to IEEE 802.11ad, 5G cellular, or the like.

In the present embodiment, the antenna 110 of the DUT 100 uses a radio signal in each regulated frequency band in conformity with, for example, LTE or 5G NR communication standard. The DUT 100 constitutes the device under test, that is, a mobile terminal in the present invention.

In the internal space 51 of the OTA chamber 50, the DUT 100 is held by a part of mechanism of the DUT scanning mechanism 56. The DUT scanning mechanism 56 is provided to extend in a vertical direction on the bottom surface 52a of the housing main body 52 in the internal space 51 of the OTA chamber 50. The DUT scanning mechanism 56 performs a total spherical scanning (refer to FIGS. 5 to 6), which will be described later, on the DUT 100 while holding the DUT 100 on which a performance test is performed.

As shown in FIG. 1, the DUT scanning mechanism 56 includes a turntable 56a, a support column member 56b, a DUT mounting portion 56c, and a drive unit 56e. The turntable 56a includes a plate member having a disk shape, and has a configuration (refer to FIGS. 3 and 7) that rotates around an azimuth axis (a rotation axis in the vertical direction). The support column member 56b includes a columnar member disposed to extend in a direction perpendicular to a plate surface of the turntable 56a.

The DUT mounting portion 56c is disposed near an upper end of the support column member 56b to be in parallel with the turntable 56a, and has a mounting tray 56d on which the DUT 100 is mounted. The DUT mounting portion 56c has a configuration (refer to FIGS. 3 and 7) capable of rotating around the roll axis (a rotation axis in a horizontal direction).

Figure 3:
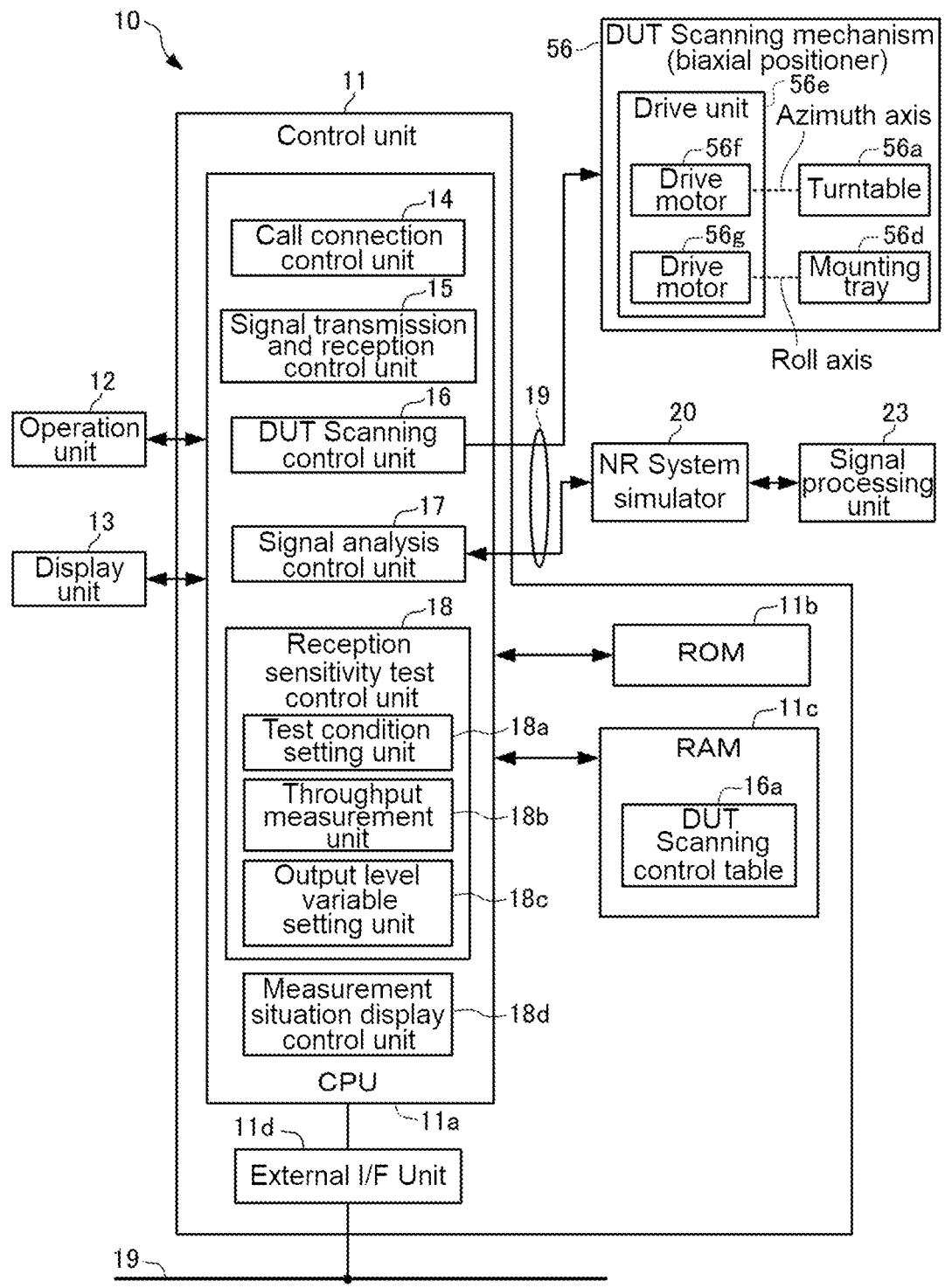
FIG. 3 is a block diagram showing functional configurations of an integrated control device of the measuring device according to the embodiment of the present invention and a controlled element thereof.

As shown in FIG. 3, the drive unit 56e includes, for example, a drive motor 56f that rotationally drives the azimuth axis, and a drive motor 56g that rotationally drives the roll axis. The drive unit 56e includes a biaxial positioner provided with a mechanism for rotating the azimuth axis and the roll axis around respective shaft centers thereof by the drive motor 56f and the drive motor 56g. In this way, the drive unit 56e can rotate the DUT 100 mounted on the mounting tray 56d in biaxial (the azimuth axis and the roll axis) directions for each mounting tray 56d. Hereinafter, there is a case where the entire DUT scanning mechanism 56 including the drive unit 56e is referred to as the biaxial positioner (refer to FIG. 3).

Figure 5A:
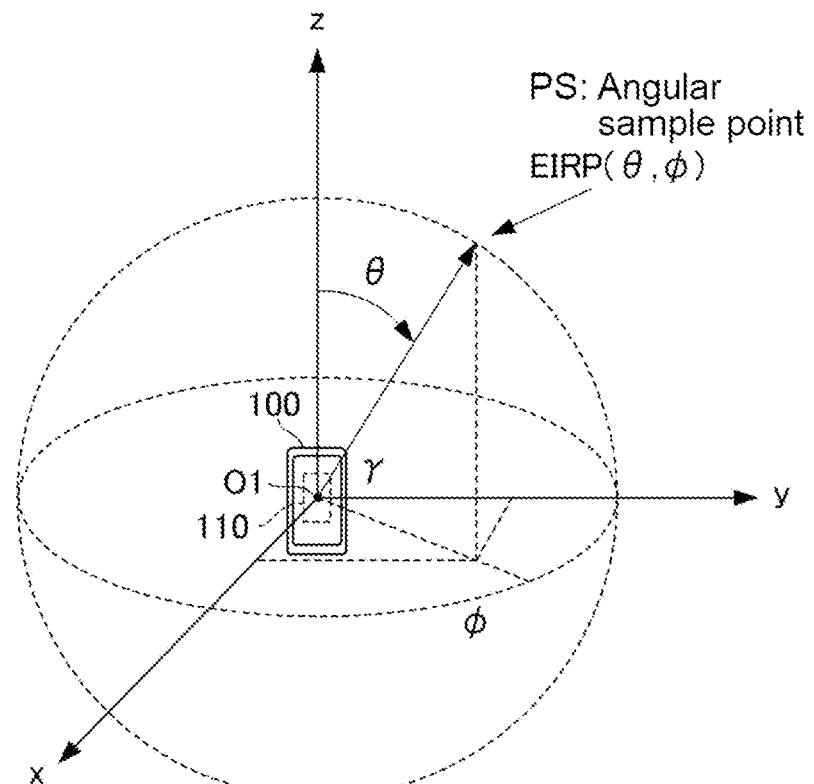
Figure 5B:
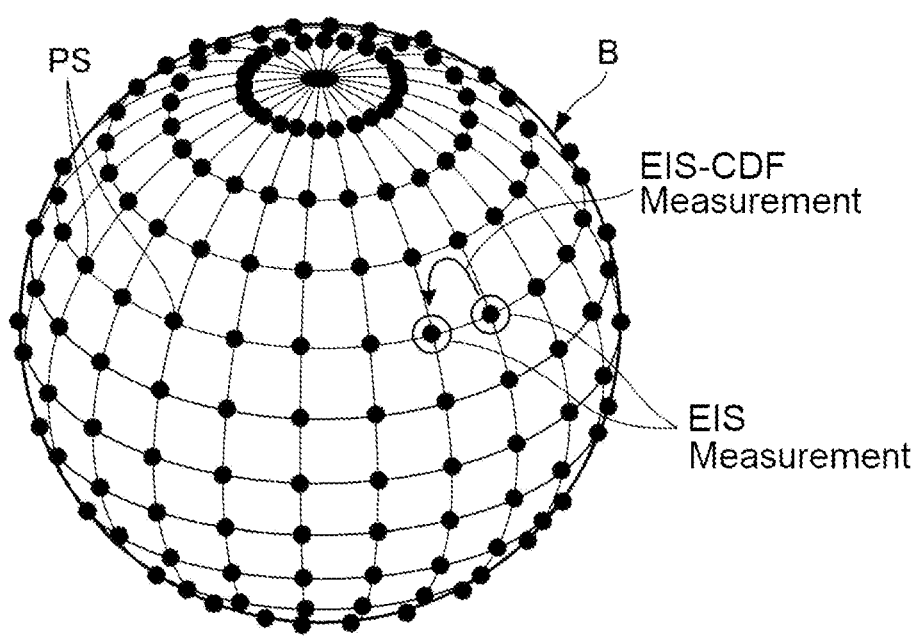

The DUT scanning mechanism 56 performs total spherical scanning which sequentially changes a posture of the DUT 100 in a state in which the antenna 110 faces all orientations of a surface of the sphere while assuming that the DUT 100 mounted (held) on the mounting tray 56d is disposed, for example, at a center O1 of a sphere (refer to a sphere B in FIGS. 5A and 5B). Control of the DUT scanning in the DUT scanning mechanism 56 is performed by a DUT scanning control unit 16 which will be described later. The DUT scanning mechanism 56 constitutes the positioner in the present invention.

The test antenna 5 is attached to a required position on the bottom surface 52a of the housing main body 52 of the OTA chamber 50 by using an appropriate holder (not shown). An attachment position of the test antenna 5 is a position at which visibility can be secured from the reflector 7 via an opening 67a provided on the bottom surface 52a. The test antenna 5 corresponds to a radio signal in the frequency band of the same regulation (NR standard) as the antenna 110 of the DUT 100.

In a case where measurement related to the NR of the DUT 100 is performed in the OTA chamber 50, the test antenna 5 transmits a test signal from the NR system simulator 20 to the DUT 100 and receives a signal under measurement transmitted from the DUT 100 that has received the test signal. The test antenna 5 is disposed so that a reflection surface thereof becomes a focal position F of the reflector 7. The reflector 7 is not always required in a case where the test antenna 5 can be disposed so that an orientation pattern thereof faces the DUT 100 and appropriate transmission and reception can be performed.

The reflector 7 is attached to a required position on the side surface 52b of the OTA chamber 50 by using a reflector holder 58. The reflector 7 realizes a radio wave path that returns the radio signal (the test signal and the signal under measurement) transmitted and received by the antenna 110 of the DUT 100 to the reflection surface of the test antenna 5.

Subsequently, configurations of the integrated control device 10 and the NR system simulator 20 will be described.

As shown in FIG. 2, the integrated control device 10 is communicably connected to the NR system simulator 20 via a network 19 such as Ethernet (registered trademark). Further, the integrated control device 10 is also connected to a controlled system element in the OTA chamber 50, for example, the DUT scanning control unit 16 via the network 19.

The integrated control device 10 comprehensively controls the NR system simulator 20 and the DUT scanning control unit 16 via the network 19, and includes, for example, a Personal Computer (PC). The DUT scanning control unit 16 may be independently provided accompanying with the OTA chamber 50 (refer to FIG. 2), or may be provided in the integrated control device 10 as shown in FIG. 3. Hereinafter, description will be performed while assuming that the integrated control device 10 has the configuration shown in FIG. 3. The integrated control device 10 constitutes measurement control means of the present invention.

As shown in FIG. 3, the integrated control device 10 includes a control unit 11, an operation unit 12, and a display unit 13. The control unit 11 includes, for example, a computer device. The computer device includes a Central Processing Unit (CPU) 11a that performs predetermined information processing to realize the function of the measuring device 1, and performs comprehensive control on the NR system simulator 20, and the DUT scanning control unit 16 as targets, a Read Only Memory (ROM) 11b that stores an Operating System (OS) for starting up the CPU 11a, the other programs, and control parameters, and the like, a Random Access Memory (RAM) 11c that stores execution code, data, and the like of the OS or an application which is used for an operation by the CPU 11a, an external I/F unit 11d, an input and output port (not shown), and the like.

The external I/F unit 11d is communicably connected to each of the NR system simulator 20 and the drive unit 56e of the DUT scanning mechanism (biaxial positioner) 56 via the network 19. An operation unit 12 and a display unit 13 are connected to the input and output port. The operation unit 12 is a functional unit for inputting various information such as commands, and the display unit 13 is a functional unit for displaying various information such as an input screen, measurement results, and the like of the various information. In the present embodiment, the display unit 13 has a function of displaying a measurement progress display screen 13a (refer to FIG. 10) in EIS-CDF measurement.

The computer device described above functions as the control unit 11 in such a way that the CPU 11a executes a program stored in the ROM 11b while using the RAM 11c as a work area. As shown in FIG. 3, the control unit 11 includes a call connection control unit 14, a signal transmission and reception control unit 15, a DUT scanning control unit 16, a signal analysis control unit 17, a reception sensitivity test control unit 18, and a measurement situation display control unit 18d. The call connection control unit 14, the signal transmission and reception control unit 15, the DUT scanning control unit 16, the signal analysis control unit 17, the reception sensitivity test control unit 18, and the measurement situation display control unit 18d are also realized by executing a predetermined program stored in the ROM 11b in the work area of the RAM 11c by the CPU 11a.

The call connection control unit 14 drives the test antenna 5 via the NR system simulator 20 and the signal processing unit 23 to transmit and receive a control signal (radio signal) to and from the DUT 100, thereby performing control to establish a call (a state in which the radio signal can be transmitted and received) between the NR system simulator 20 and the DUT 100.

The signal transmission and reception control unit 15 performs a control of monitoring an user operation in the operation unit 12, transmitting a signal transmission command to the NR system simulator 20 after the call is established through the call connection control, by being triggered with predetermined measurement start operation related to the measurement of transmission and reception characteristics of the DUT 100, and transmitting the test signal from the NR system simulator 20 via the test antenna 5, and a control of transmitting a signal reception command and receiving the signal under measurement via the test antenna 5.

The DUT scanning control unit 16 drives and controls the drive motors 56f and 56g of the DUT scanning mechanism to perform total spherical scanning of the DUT 100 mounted on the mounting tray 56d of the DUT mounting portion 56c.

Here, the total spherical scanning of the DUT 100 will be described with reference to FIGS. 5A to 7. Generally, related to measurement of power of a signal radiated by the DUT 100 (radiated power measurement), a method for measuring an Equivalent Isotropic Radiated Power (EIRP) and a method for measuring Total Radiated Power (TRP) are known. The EIRP is, for example, a power value measured at each measurement point ($\theta$, $\varphi$) in a spherical coordinate system ($\gamma$, $\theta$, $\varphi$) shown in FIG. 5A. On the other hand, the TRP is obtained by measuring the EIRP in all orientations of the spherical coordinate system ($\gamma$, $\theta$, $\varphi$), that is, at a plurality of angular sample points PS (refer to FIG. 5B), which are regulated in advance, on a spherical surface equidistant from a center O1 (hereinafter, a reference point) of the total spherical scanning of the DUT 100, and obtaining a total sum thereof.

The total spherical scanning of the DUT 100 means a control operation of sequentially changing the DUT 100 mounted on the mounting tray 56d in all directions of a surface of a sphere B while using, for example, a center of the sphere B (refer to FIGS. 5A and 5B) as a reference (center), that is, sequentially changing a posture of the DUT 100 in a state in which the antenna 110 faces the angular sample point PS.

Figure 6:
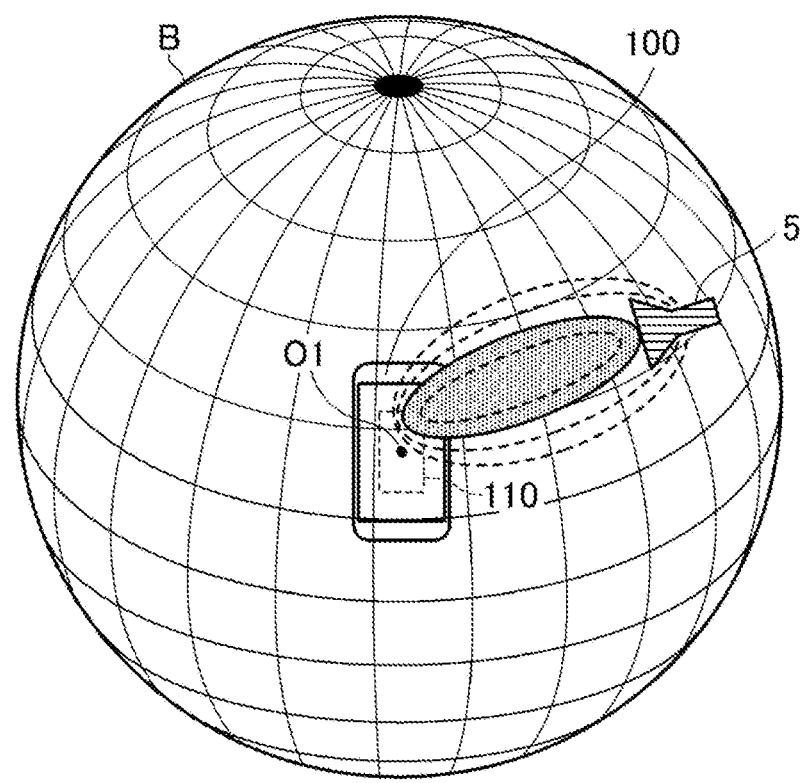
FIG. 6 is a diagram explaining a disposition mode of a test antenna 5 in the OTA chamber of the measuring device according to the embodiment of the present invention using the spherical coordinate system (γ, θ, φ) shown in FIGS. 5A and 5B.

In order to measure the EIRP at each angular sample point PS in accordance with the total spherical scanning of the DUT 100, as shown in FIG. 6, the test antenna 5 for receiving a signal radiated by the DUT 100 is disposed at a position of a specific angular sample point PS (one point) in the spherical coordinate system ($\gamma$, $\theta$, $\varphi$).

In the total spherical scanning, the DUT 100 is driven (scanned) so that an antenna surface of the antenna 110 sequentially faces the light reception surface of the test antenna 5. As a result, the test antenna 5 can transmit and receive a signal for the TRP measurement to and from the antenna 110 of the DUT 100 on which the total spherical scanning is performed. Here, the transmitted and received signal is a test signal that is transmitted from the NR system simulator 20 via the test antenna 5, and a signal that is transmitted by the DUT 100, which has received the test signal, using the antenna 110, that is, a signal under measurement that is received via the test antenna 5.

Figure 7:
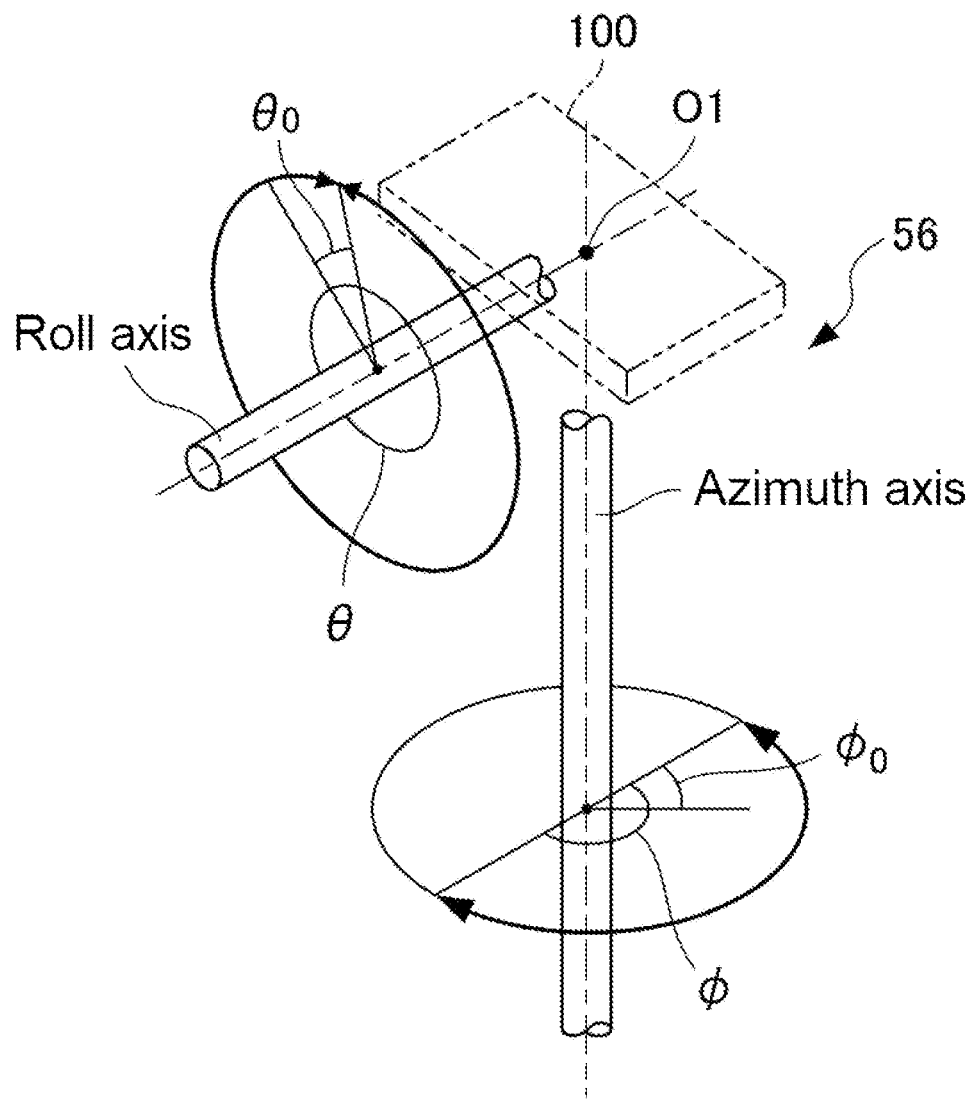
FIG. 7 is a diagram showing a rotation drive image around an azimuth axis and a roll axis of a biaxial positioner related to the total spherical scanning of the DUT in the measuring device according to the embodiment of the present invention.

The total spherical scanning of the DUT 100 is realized by rotationally driving the azimuth axis and the roll axis by the drive motors 56f and 56g which constitutes the DUT scanning mechanism 56. FIG. 7 shows a rotation drive image around the azimuth axis and the roll axis of the DUT scanning mechanism (biaxial positioner) 56 related to the total spherical scanning of the DUT 100 in the measuring device 1. As shown in FIG. 7, in the DUT scanning mechanism 56 of the measuring device 1 according to the present embodiment, the azimuth axis is moved in an angular direction of $\varphi$ around the axis thereof, for example, within a range of 180 degrees and the roll axis is moved in an angular direction of $\theta$ around the axis thereof, for example, within a range of 360 degrees, so that it is possible to perform the total spherical scanning (refer to FIGS. 5A to 6) in which the DUT 100 is rotated in all directions based on the center O1 thereof.

In FIG. 7, $\varphi_0$ indicates a unit movement angle in a total movement angle (180 degrees) in the rotation direction (angular direction of $\varphi$) of the azimuth axis, and $\theta_0$ indicates the unit movement angle (hereinafter, step angle) in the total movement angle (360 degrees) in the rotation direction (angular direction of $\theta$) of the roll axis. For $\varphi_0$ and $\theta_0$, for example, a step angle of a desired value can be selectively set from a plurality of step angles of different values which are regulated in advance. The set $\varphi_0$ and $\theta_0$ regulate an angle between the adjacent angular sample points PS shown in FIG. 5B, and, as a result, regulates the angular sample point PS, that is, the number of measurement positions.

In order to realize control of the total spherical scanning of the DUT 100 by the DUT scanning control unit 16, for example, a DUT scanning control table 16a is prepared in the ROM 11b in advance. The DUT scanning control table 16a stores, for example, coordinates of each angular sample point PS (refer to FIG. 5B) in the spherical coordinate system (refer to FIG. 5A) related to the total spherical scanning of the DUT 100, drive data of the drive motors 56f and 56g associated with the coordinates of each angular sample point PS, and control data associated with a stop time (measurement time) at each angular sample point PS. In a case where the drive motors 56f and 56g are, for example, stepping motors, for example, the number of drive pulses is stored as the drive data.

The DUT scanning control unit 16 expands the DUT scanning control table 16a into the work area of the RAM 11c, and drives and controls the drive motors 56f and 56g of the DUT scanning mechanism 56 based on the control data stored in the DUT scanning control table 16a. As a result, the total spherical scanning of the DUT 100 mounted on the DUT mounting portion 56c is performed. In the total spherical scanning, the antenna surface of the antenna 110 of the DUT 100 is stopped for a regulated time (the stop time) toward the angular sample point PS for each angular sample point PS in the spherical coordinate system, and, thereafter, an operation of moving to a next angular sample point PS (scanning of the DUT 100) is sequentially performed while targeting all the angular sample points PS.

In a case where the total spherical scanning of the DUT 100 is performed, the signal analysis control unit 17 captures the radio signal related to NR received by the test antenna 5 via the NR system simulator 20, and performs an analysis process (measurement process) on the radio signal as a signal related to the EIS-CDF measurement.

In accordance with the total spherical scanning of the DUT 100 described above, the measuring device 1 can also measure Equivalent Isotropic Sensitivity (EIS) at each measurement position in the spherical coordinate system (γ, θ, φ). EIS measurement is to evaluate the reception sensitivity of the DUT 100 in such a way that the test signal is transmitted from the NR system simulator 20 via the test antenna 5, and the DUT 100, which has received the test signal, receives a signal (signal under measurement) transmitted by the antenna 110.

In the EIS measurement at each measurement position, a reception sensitivity test is performed a plurality of times by transmitting an output level of the test signal while changing the output level, measuring a throughput of the signal (signal under measurement) transmitted by the DUT 100 that has received the test signal, and calculating a Cumulative Distribution Function (CDF) of EIS according to a measurement result of the throughput. In FIG. 6, a plurality of elliptical shapes interposed between the test antenna 5 and the DUT 100 show an image for changing and setting the output level of the test signal in the reception sensitivity test related to the EIS measurement.

In a case where the EIS measurement is performed, the reception sensitivity test control unit 18 performs control related to the reception sensitivity test for causing the DUT 100 to receive the test signal transmitted from the signal generation unit 21a of the NR system simulator 20 and to transmit the signal under measurement in response, and inputting the signal under measurement to the signal measurement unit 21b of the NR system simulator 20.

The reception sensitivity test control unit 18 includes a test condition setting unit 18a, a throughput measurement unit 18b, and an output level variable setting unit 18c in order to realize the reception sensitivity test related to the EIS measurement.

The test condition setting unit 18a is a functional unit that sets a test condition (step angle or the like) of the reception sensitivity test. The throughput measurement unit 18b is a functional unit that measures a throughput of the signal under measurement transmitted in response from the DUT 100 for each reception sensitivity test. The output level variable setting unit 18c is a functional unit that variably sets (for example, sequentially lowers the level) the output level of the test signal in a next reception sensitivity test according to a comparison result between the measurement result of the throughput by the throughput measurement unit 18b and a predetermined threshold value (throughput threshold value).

The measurement situation display control unit 18d has a display control function of displaying the measurement progress display screen 13a (refer to FIG. 10), which shows the progress situation of the measurement in the reception sensitivity test related to the EIS measurement, on the display unit 13. The measurement situation display control unit 18d constitutes display control means in the present invention.

Figure 4:
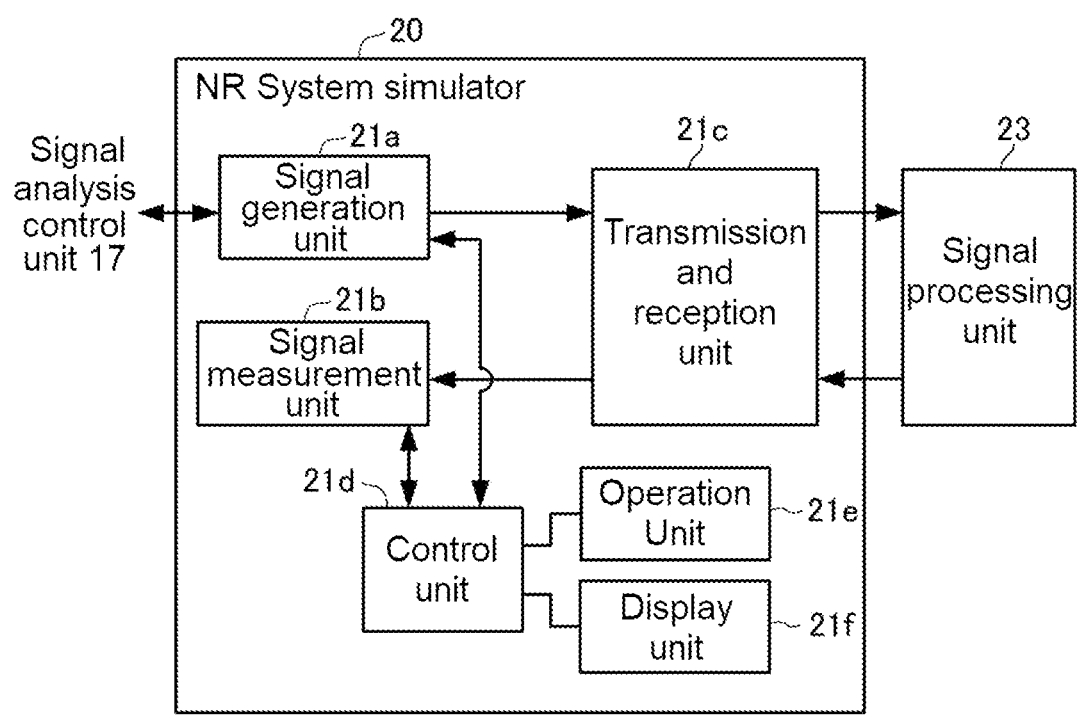
FIG. 4 is a block diagram showing a functional configuration of an NR system simulator in the measuring device according to the embodiment of the present invention.

As shown in FIG. 4, the NR system simulator 20 includes a signal generation unit 21a, a signal measurement unit 21b, a transmission and reception unit 21c, a control unit 21d, an operation unit 21e, and a display unit 22f. The NR system simulator 20 constitutes a simulation measurement device of the present invention.

The signal generation unit 21a generates a signal (baseband signal) that becomes a source of the test signal. The transmission and reception unit 21c functions as an RF unit that generates the test signal corresponding to a frequency of each communication standard from the signal generated by the signal generation unit 21a and sends the generated test signal to the signal processing unit 23, and restores the baseband signal from the signal under measurement which is sent from the signal processing unit 23. The signal measurement unit 21b performs the measurement process of the signal under measurement based on the baseband signal restored by the transmission and reception unit 21c.

The control unit 21d comprehensively controls each of the functional units including the signal generation unit 21a, the signal measurement unit 21b, the transmission and reception unit 21c, the operation unit 21e, and the display unit 22f. The operation unit 21e is a functional unit for inputting various information such as commands, and the display unit 22f is a functional unit for displaying various information such as an input screen of the various information and measurement results.

In the measuring device 1 having the above-described configuration, the DUT 100 is mounted on the mounting tray 56d of the DUT scanning mechanism (biaxial positioner) 56 in the internal space 51 of the OTA chamber 50. Therefore, it is possible to perform, in addition to EIRP measurement at each measurement position and TRP measurement over all measurement positions, the EIS measurement at each measurement position, and the EIS-CDF measurement over all the measurement positions, while moving (rotating) the DUT 100 by a preset step angle in the biaxial (azimuth axis and roll axis) direction for each mounting tray 56d.

Subsequently, an EIS-CDF measurement control operation by the integrated control device 10 of the measuring device 1 according to the present embodiment will be described with reference to a flowchart shown in FIG. 8. In the EIS-CDF measurement control operation, for example, as shown in an image in FIG. 5B, a process is performed for performing the EIS measurement for each measurement position (circled angular sample point PS), and obtaining the Cumulative Distribution Function (CDF, an arrow between the circled angular sample points PS) using a result of the EIS measurement at each measurement position.

In order to perform the EIS-CDF measurement in the measuring device 1, first, the DUT 100 to be tested is set in the DUT mounting portion 56c of the DUT scanning mechanism (biaxial positioner) 56 of the OTA chamber 50, and then a measurement parameter is set by the operation unit 12 (step S1). Here, the test condition setting unit 18a in the control unit 11 of the integrated control device 10 receives an operation input in the operation unit 12, sets the measurement item as the EIS-CDF measurement, and, further, sets the step angle between the measurement positions.

After setting of the measurement parameter is completed, the integrated control device 10 monitors whether or not the measurement start operation is performed in the operation unit 12 (step S2). In a case where the measurement start operation is performed here (YES in step S2), the measurement situation display control unit 18d increments an index number by "1", and secures a list display area for each of the items 131, 132, and 133 corresponding to the index number "1" ((0, 1) in an example of FIG. 10) of the EIS-CDF measurement situation display area 13c (first display area) of the measurement progress display screen 13a (step S3).

Subsequently, the DUT scanning control unit 16 rotationally drives the drive motors 56f and 56g so as to rotate (move) the biaxial positioner up to an angular position of (θ, φ) corresponding to an initial measurement position in the spherical coordinate system (γ, θ, φ) shown in FIG. 5A based on the step angle set in step S1 (step S4).

Subsequently, the reception sensitivity test control unit 18 drives and controls the NR system simulator 20, and performs control so that the EIS measurement is performed at the measurement position corresponding to the angular position of the biaxial positioner in step S4 (the first measurement is performed at the initial measurement position) (step S5).

In the EIS measurement at the initial measurement position, the reception sensitivity test control unit 18 inputs the signal generated from the signal generation unit 21a of the NR system simulator 20 to the signal processing unit 23 so as to generate the test signal, and transmits the test signal to the DUT 100 by the test antenna 5. Subsequently, the reception sensitivity test control unit 18 controls the throughput measurement unit 18b and the output level variable setting unit 18c so as to perform the reception sensitivity test of repeating throughput measurement a plurality of times while causing the test antenna 5 to receive the signal under measurement transmitted by the DUT 100 which has received the test signal, further causing the signal measurement unit 21b to measure a throughput of the signal under measurement via the signal processing unit 23 and the transmission and reception unit 21c, and changing the output level of the test signal.

In a case where a measured value of the throughput becomes equal to or less than the threshold value while the reception sensitivity test is performed a plurality of times, the reception sensitivity test control unit 18 holds (stores) a measured value of an immediately before throughput, which is equal to or less than the threshold value, and performs control so that next throughput measurement is not performed after.

Figure 9:
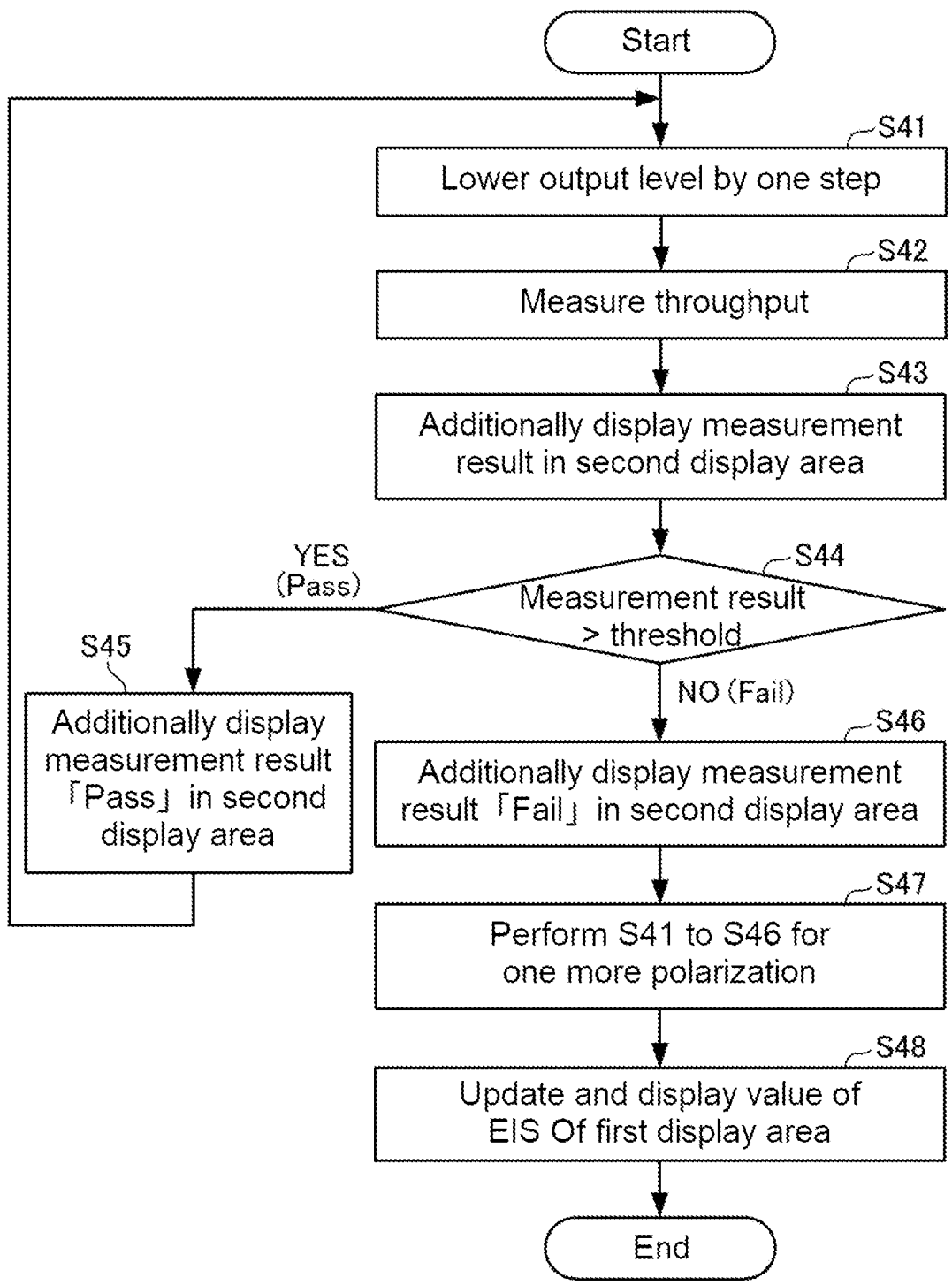
FIG. 9 is a flowchart showing a measurement situation display processing operation during the EIS-CDF measurement by the integrated control device of the measuring device according to the embodiment of the present invention.

The above-described reception sensitivity test is performed once for each of the test signals of a θ polarization and a φ polarization, which are linearly polarizations orthogonal to each other (refer to steps S41 to S46 and S47 in FIG. 9). In a case where a total of two reception sensitivity tests are completed, the reception sensitivity test control unit 18 calculates an average value of both measured values as an EIS value from the measured values (the measured value corresponding to the φ polarization and the measured value corresponding to the φ polarization) of the immediately before throughput, which is equal to or less than the throughput value, that is held in a case where the reception sensitivity test is completed at each time (refer to step S48 in FIG. 9).

In a case where the EIS measurement (calculation of EIS value=EIS(Total)) at the initial measurement position is completed in step S5, the DUT scanning control unit 16 subsequently determines whether or not a remaining measurement position exists (step S6).

In a case where it is determined that the remaining measurement position exists (YES in step S6), the index number is further incremented by "1" and the list display area corresponding to the index number (0, 2) is secured in the EIS-CDF measurement situation display area 13c of the measurement progress display screen 13a (step S3), and the DUT scanning control unit 16 rotationally drives the drive motors 56f and 56g so that the biaxial positioner is moved to the angular position of (θ, φ) corresponding to a next measurement position in the spherical coordinate system (γ, θ, φ) (step S4). Here, an angle at which the biaxial positioner is moved (angle from a previous measurement position to the next measurement position) corresponds to the step angle at which the setting is received in step S1.

In a case where the movement of the step angle of the biaxial positioner is completed and the movement is stopped at the next measurement position, the reception sensitivity test control unit 18 drives and controls the NR system simulator 20 so as to perform the EIS measurement at the next (second) measurement position corresponding to the angular position of the biaxial positioner in step S4 (step S5).

Thereafter, while it is determined that the remaining measurement position exists in step S6 (YES in step S6), the DUT scanning control unit 16 and the signal analysis control unit 17 perform the EIS measurement at the remaining measurement position by repeating the processes in steps S3 to S6.

In a case where it is determined that the remaining measurement position does not exist in step S6 (NO in step S6) while repeating the control for updating the measurement position and performing the EIS measurement at the updated measurement position, the reception sensitivity test control unit 18 aggregates EIS measurement results (EIS (Total)) at all the set measurement positions, holds the EI measurement results in a storage unit (step S7), and completes a series of EIS-CDF measurement control operations.

Figure 8:
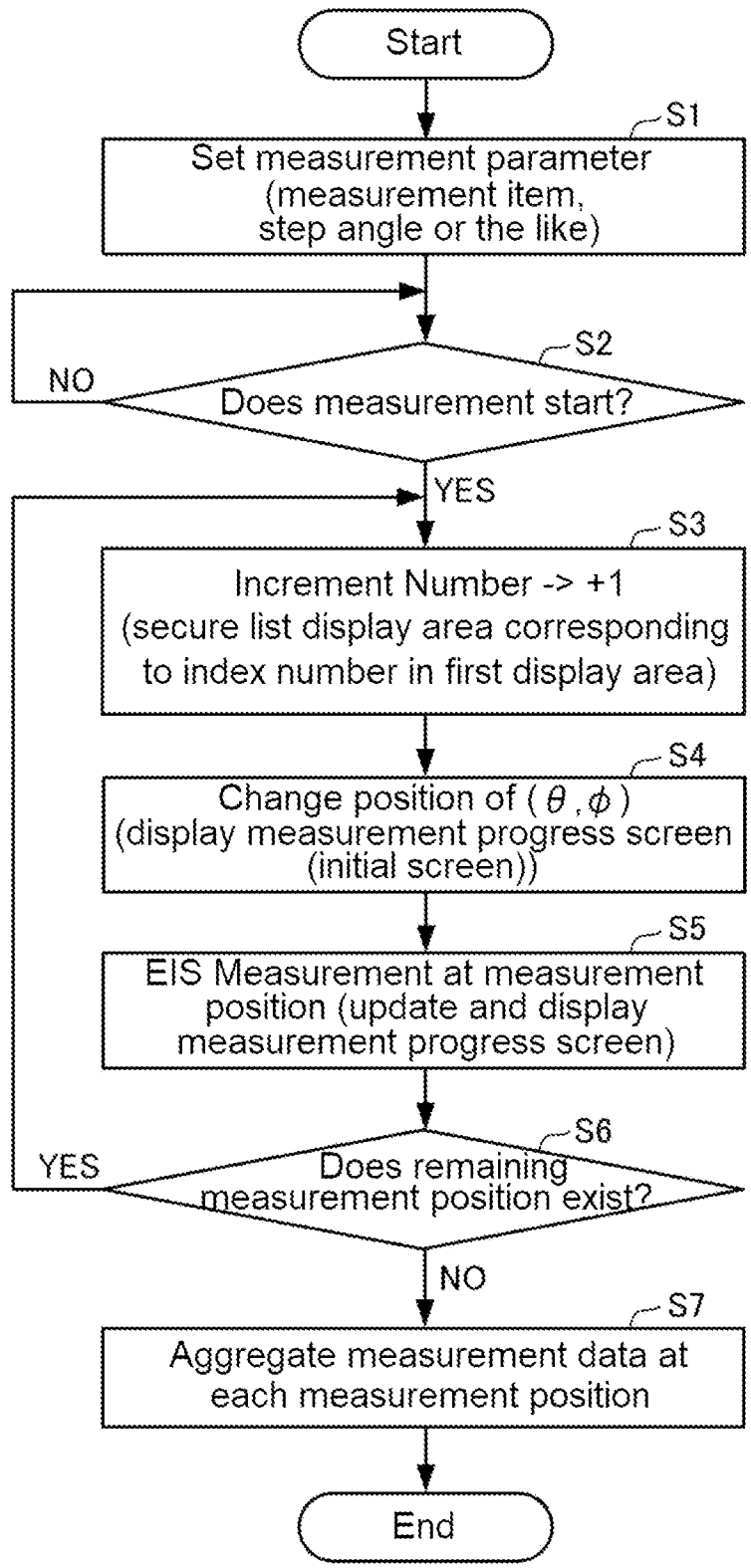
FIG. 8 is a flowchart showing an EIS-CDF measurement control operation of the DUT by an integrated control device of a measuring device according to an embodiment of the present invention.

As described above, in a case where the EIS-CDF measurement shown in FIG. 8 is performed, the measuring device 1 controls the NR system simulator 20 to execute, at respective measurement positions corresponding to a plurality of orientations, the reception sensitivity test in which the integrated control device 10 transmits the test signal from the test antenna 5 to the DUT 100 in accordance with the rotation of the biaxial positioner, the signal under measurement, which is transmitted from the DUT 100 that has received the test signal, is received by the test antenna 5 and the throughput is measured based on the signal under measurement, and the throughput measurement is repeated while changing the output level of the test signal.

Further, in the EIS-CDF measurement, the measurement situation display control unit 18d performs a display process of the measurement progress display screen 13a in accordance with the EIS measurement process at each measurement position, as shown in parentheses in steps S4 and S5 of FIG. 8. That is, the measurement situation display control unit 18d displays an initial screen of the measurement progress display screen 13a in accordance with the movement control to the initial measurement position of the biaxial positioner in step S4, and further performs control to update and display a value of each item of the measurement progress display screen 13a in accordance with the progress of the EIS measurement in step S5.

Figure 10:
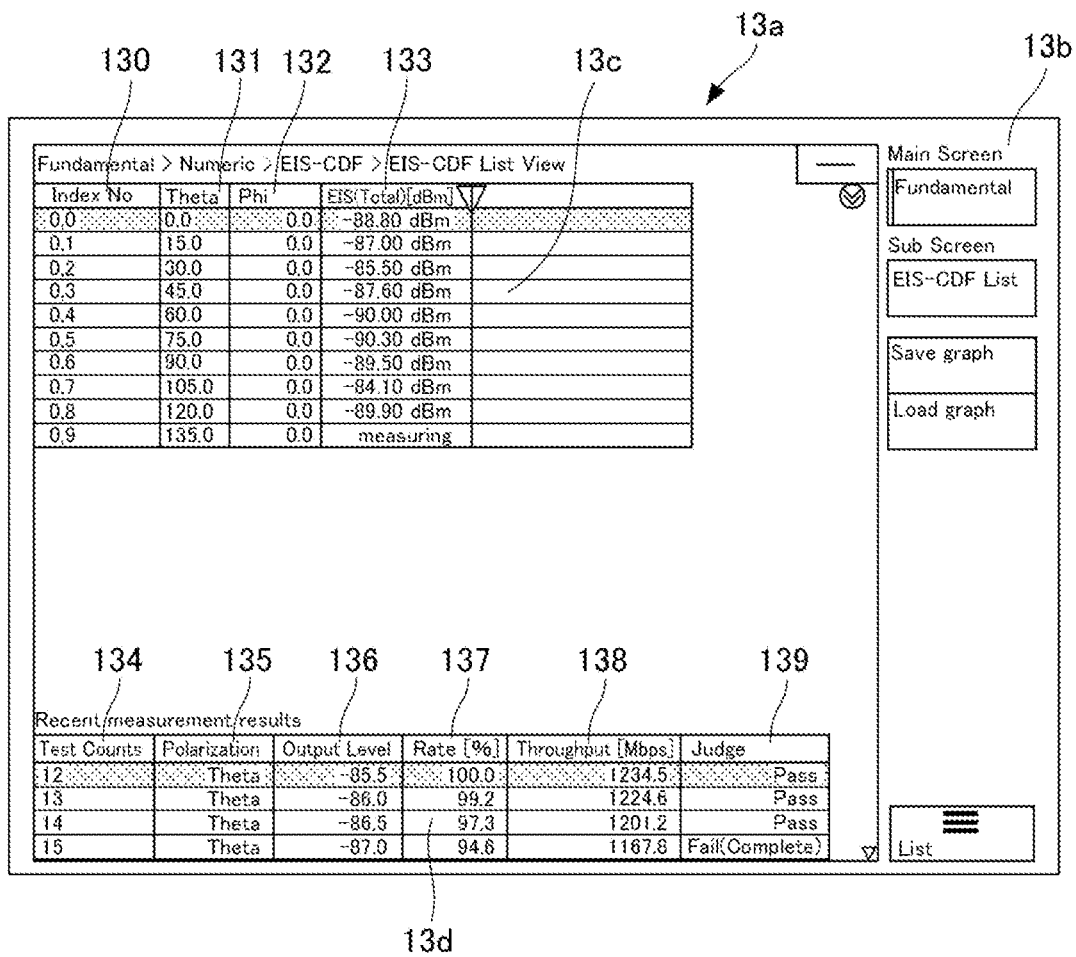
FIG. 10 is a diagram showing a display example of a measurement progress situation display screen during the EIS-CDF measurement by the integrated control device of the measuring device according to the embodiment of the present invention.

As shown in FIG. 10, the measurement progress display screen 13a includes an item selection tool display area 13b, an EIS-CDF measurement situation display area 13c, and an EIS measurement situation display area 13d. The item selection tool display area 13b is an area for displaying various item selection tools used to select a display item (hereinafter, an item) to be displayed on the measurement progress display screen 13a. The EIS-CDF measurement situation display area 13c is a display area for displaying an EIS-CDF measurement result up to the measurement position where the above-described EIS measurement is completed. The EIS measurement situation display area 13d is a display area for displaying a progress situation of the EIS measurement at the measurement position where the throughput measurement is started in the EIS measurement. The EIS-CDF measurement situation display area 13c and the EIS measurement situation display area 13d constitute a first display area and a second display area of the present invention, respectively.

The EIS-CDF measurement situation display area 13c includes, in addition to an index number item 130 indicating an order of measurement, respective items 131, 132, and 133 of a rotation angle θ around a roll axis of the biaxial positioner corresponding to the measurement position of an EIS measurement target, a rotation angle φ around the same azimuth axis, and the EIS measurement result (unit: dBm) at the measurement position. For the respective items 130, 131, 132, and 133 of the EIS-CDF measurement situation display area 13c, the measurement situation display control unit 18d performs display control to update and display the respective values (the index number, the rotation angle θ, the rotation angle φ, and the EIS measurement result) in accordance with the progress of the cumulative distribution measurement.

In the EIS measurement situation display area 13d includes, in addition to an item 134 indicating the number of tests (Test Counts) related to the cumulative distribution measurement, respective items 135, 136, 137, 138, and 139 of a polarization of the test signal (Polarization), the output level of the test signal (Output level, unit: dBm), a transmission rate of the test signal (Rate, unit: %), the measured value of the throughput (Throughput) of the signal under measurement transmitted by the DUT 100 that has received the test signal (unit: Mbps), and a measurement result of whether or not the measured value of the throughput exceeds a preset threshold value (Judge: success (Pass) or failure (Fail)). The measurement situation display control unit 18d updates and displays, for the respective items 134, 135, 136, 137, 138, and 139 of the EIS measurement situation display area 13d, the respective values (the test count, the polarization of the test signal, the output level of the test signal, the throughput measurement value, the value of the judgment result) in accordance with the progress of the EIS measurement.

The initial screen of the measurement progress display screen 13a (refer to step S4 in FIG. 8) has a display form in which, for example, display areas of the respective items 131, 132, and 133 corresponding to the index number (0, 1) are secured in the EIS-CDF measurement situation display area 13c and in which the display areas of the respective items 135, 136, 137, 138, and 139 corresponding to the test count "12" are secured in the EIS measurement situation display area 13d.

Next, a measurement situation display processing operation during the EIS-CDF measurement by the integrated control device 10 of the measuring device 1 according to the present embodiment will be described with reference to a flowchart shown in FIG. 9. The measurement situation display process is performed in accordance with the EIS measurement in step S5 in FIG. 8, and has a display control form of updating the values of the respective items in accordance with the progress of the EIS-CDF measurement for the respective items of the measurement progress display screen 13a (initial screen) displayed in step S4.

In a case where the measurement situation display process is performed, the reception sensitivity test control unit 18, as an initial process of the reception sensitivity test for the EIS measurement at the measurement position, first switches a reception sensitivity test target into the θ polarization, lowers the output level of the test signal from the initial output level by one stage level (where an initial output level is a regulated value) by the output level variable setting unit 18c, and transmits the test signal of the θ polarization from the test antenna 5 (step S41).

Subsequently, the reception sensitivity test control unit 18 performs control to cause the test antenna 5 to receive the signal under measurement which is transmitted by the DUT 100 that has received the test signal, and to cause the throughput measurement unit 18b to measure the throughput of the received signal under measurement (step S42).

Subsequently, the measurement situation display control unit 18d performs control to display a throughput value (measured value) measured in step S42 as the item 136 of the list display area corresponding to the test count "12" secured in the EIS measurement situation display area 13d (second display area) of the measurement progress display screen 13a (step S43).

Further, the throughput measurement unit 18b determines whether or not the throughput value measured in step S42 exceeds a preset threshold value (step S44). Here, in a case where it is determined that the measured throughput value exceeds the threshold value, that is, "Pass" (YES in step S44), the measurement situation display control unit 18d performs control to display a determination result "Pass" as a value of the item 139 in the display area corresponding to the test count "12" of the EIS measurement situation display area 13d (step S45).

Thereafter, the control unit 11 returns to step S41 and performs controls to continue the processes in steps S41 to S44 for second and subsequent reception sensitivity tests. During the control, for example, in a case where it is determined that the throughput value measured in step S42 during an n-th reception sensitivity test is equal to or less than the threshold value, that is, "Fail" (NO in step S44), the measurement situation display control unit 18d performs control to display a determination result "Fail" as the value of the item 139 of the display area corresponding to a test count "n" of the EIS measurement situation display area 13d (step S46).

Next, the reception sensitivity test control unit 18 switches the reception sensitivity test target from the θ polarization to the φ polarization, and controls the throughput measurement unit 18b, the output level variable setting unit 18c, and the measurement situation display control unit 18d so as to execute the processes in steps S41 to S46 for the φ polarization. (step S47).

As a result, in step S47, the output level of the test signal of the φ polarization is lowered by one step from the initial output level at the measurement position, the test signal is transmitted from the test antenna 5 (refer to step S41), the signal under measurement transmitted by the DUT 100 that has received the test signal is received by the test antenna 5, and the throughput measurement of the signal under measurement is performed (refer to step S42).

Here, the throughput value (measured value) is displayed as the item 136 of the list display area corresponding to the test count "12" of the EIS measurement situation display area 13d of the measurement progress display screen 13a. At this time, the polarization of item 135 is switched to a display of Phi indicating the φ polarization.

Further, it is determined whether or not the measured throughput value exceeds the threshold value (refer to step S44). Here, in a case where "Pass" is determined based on a fact that the throughput value exceeds the threshold value, the determination result "Pass" is displayed as the value of the item 139 of the display area corresponding to the test count "12" of the EIS measurement situation display area 13d.

Thereafter, the same processes as in steps S41 to S44 are performed for the second and subsequent reception sensitivity tests. During the period, for example, in a case where "Fail" is determined based on a fact that the throughput value measured in the n-th reception sensitivity test is equal to or less than the threshold value, the determination result "Fail" is displayed as the value of the item 139 of the display area corresponding to the test count "n" of the EIS measurement situation display area 13d.

In the process so far, the reception sensitivity test of the θ polarization in steps S41 to S46 is performed a plurality of times until the measured value of the throughput is determined to be "Fail", subsequently, the reception sensitivity test of the φ polarizations in step S47 is performed a plurality of times, and the measured value of the throughput is determined to be "Fail" at a certain time, so that the reception sensitivity test of the φ polarization is completed.

Subsequently, the measurement situation display control unit 18d updates and displays the value (EIS (Total)) of the item 133 corresponding to the index number of the EIS-CDF measurement situation display area 13c of the measurement progress display screen 13a at this time (step S48).

Here, the measurement situation display control unit 18d calculates the value of EIS (Total) to be update using the following Equation (1).

$$EIS=2*[1/EIS(PolMes=\theta,PolLink=\theta)+1/EIS(PolMes=\varphi,PolLink=\varphi)] \quad (1)$$

In Equation (1), a left term with respect to "+" in H indicates the EIS value obtained in the reception sensitivity test of the θ polarization (refer to steps S41 to S46), and a right term indicates the EIS value obtained in the reception sensitivity test of the φ polarization (refer to step S47).

That is, the measurement situation display control unit 18d has a control function of calculating and displaying, as EIS (Total), an immediately before average value of the EIS value of the θ polarization and the EIS value of the φ polarization, in which the measured value of the throughput is determined as "Fail", for each measurement position.

After updating and displaying EIS (Total) in step S48, control is performed to complete a series of measurement situation display processing operation. In a case where the measurement situation display processing operation is completed, the value (EIS (Total)) of the item 133 of the EIS-CDF measurement situation display area 13c is changed and displayed from "measuring" indicating that the measurement is in progress to a value (the average value of the EIS values of the θ polarization and the φ polarization) of the output level of the test signal in a case where it is determined that the throughput value in an immediately before reception sensitivity test is "Pass".

A flow of updating and displaying the EIS-CDF measurement situation display area 13c and the EIS measurement situation display area 13d in the measurement situation display processing operation of FIG. 9 will be described in more detail using the measurement progress display screen 13a shown in FIG. 10 as an example.

The measurement progress display screen 13a shown in FIG. 10 shows a display form in which the EIS measurement is completed at each measurement position corresponding to the index numbers (0,1) to (0,8) displayed in the EIS-CDF measurement situation display area 13c and the EIS measurement of the θ polarization is executed at the measurement position corresponding to the index number (0, 9).

At this time, the EIS-CDF measurement situation display area 13c displays, as the value of item 133, the EIS measurement result (EIS (Total)) corresponding to the respective index numbers (0,1) to (0,8) at each measurement position in which the measurement has already been completed. The values of the measurement results are the values (where the average value of the EIS values of the θ polarization and the φ polarization) of the output level (corresponding to item 136 of the EIS measurement situation display area 13d) of the test signal specified in a case where the throughput measurement performed a plurality of times is completed at each measurement position) At this time, the item 133 corresponding to the index number (0, 9) is displayed with a value ("measuring") indicating that the measurement is being executed.

On the other hand, for the EIS measurement situation display area 13d of the measurement progress display screen 13a, the values of the items 134, 135, 136, 137, 138, and 139 are sequentially updated and displayed in accordance with the progress of the EIS measurement at the measurement position corresponding to the index number (0, 9). In the example, the test count sequentially progresses from "12" to "15", and the polarization (θ polarization in the example of FIG. 10) of the test signal, the output level of the test signal, the transmission rate of the test signal, the measurement value of the throughput, and the value of the judgment result, which correspond to each value of the test count, are sequentially updated and displayed. Here, a display form may be provided in which the list display area corresponding to the test count before "12" is hidden by a scroll.

Here, the value of the determination result (Judge) of item 139 is "Pass" in the tests at times corresponding to the test counts "12" to "14", and is "Fail" in the test at the time corresponding to the test count "15". As a result, the throughput measurement for the EIS measurement of the θ polarization at the measurement position (corresponding to the index number (0, 9)) is completed at a fourth time. In a case where the EIS measurement of the φ polarization is performed, the values of the items 134, 135, 136, 137, 138, and 139 are sequentially updated and displayed in accordance with the progress of the measurement.

In a case where the test is completed (refer to step S48 in FIG. 9), the measurement situation display control unit 18d displays a value corresponding to an output level of the test signal immediately before the output level of the test signal which is determined that the measurement value of the throughput is lower than the threshold value ("Fail") among the output levels of the test signals displayed as the item 136 in the EIS measurement situation display area 13d at a field of the item 133 of the EIS measurement result (EIS (Total)) corresponding to the index number (0, 9) corresponding to the measurement position of the EIS-CDF measurement situation display area 13c. A value specifically displayed is a value calculated by the above Equation (1), and, in a case where the threshold value is 95%, the value is obtained by averaging the output level −86.5 dBm of the test signal corresponding to the test count "14" immediately before the test count "15" in which the transmission rate is 94.6%, and the output level corresponding to the test count (for example, the same "14"), which is performed in the same manner, of the φ polarization. The average value of both the output levels immediately before falling below the threshold values of the θ polarization and the φ polarization, which are calculated as above, is displayed after being changed from the display of "measuring".

As described above, in addition to the display of the EIS-CDF measurement result (EIS (Total)) at each measurement position in the EIS-CDF measurement situation display area 13c in a list format, the measuring device 1 according to the present embodiment has a measurement progress situation display control function of displaying the measurement situation up to the present for obtaining the EIS in the EIS measurement situation display area 13*d* by providing the respective items, such as the polarization of the test signal (Polarization), the output level of the test signal (Output Level), the throughput of the signal under measurement (Throughput), or a Pass/Fail determination result (Judge) related to the throughput.

As described above, the measuring device 1 according to the present embodiment includes a positioner (DUT scanning mechanism 56) that is provide in an internal space 51 of a n OTA chamber 50 and rotates a DUT 100 to sequentially face all preset orientations of a spherical coordinate system; an NR system simulator 20 that is connected to a test antenna 5 in the internal space 51; an integrated control device 10 that controls the NR system simulator 20 to perform, at each measurement position corresponding to the plurality of orientations, a reception sensitivity test for transmitting a test signal from the test antenna 5 to the DUT 100 in accordance with rotation of the positioner, receiving a signal under measurement transmitted from the DUT 100 which has received the test signal by the test antenna 5, measuring a throughput based on the signal under measurement, and repeating the measurement of the throughput while changing an output level of the test signal; and a measurement situation display control unit 18*d* for displaying, in accordance with a progress of the reception sensitivity test at each measurement position, a measurement progress display screen 13*a* having an EIS-CDF measurement situation display area 13*c* for displaying a result of the reception sensitivity test up to the measurement position where the reception sensitivity test is completed, an EIS measurement situation display area 13*d* for displaying a measurement progress situation of the reception sensitivity test at the measurement position where the reception sensitivity test is started.

With the configuration, the measuring device 1 according to the present embodiment can grasp the progress situation of the reception sensitivity test, which indicates a signal level that can be normally received by the DUT 100 during the reception sensitivity test at each measurement position from the display content of the EIS measurement situation display area 13*d*. As a result, it is possible to confirm the progress situation of the measurement in the reception sensitivity test for each of a plurality of measurement positions such as the EIS-CDF measurement, and it is possible to eliminate uncertainty related to the progress of the measurement. Furthermore, it is possible to find a cause or ascertain whether or not to perform a test again in a case where abnormality occurs, so that it is possible to estimate a test time.

Further, in the measuring device 1 according to the present embodiment, the EIS measurement situation display area 13*d* includes respective items 136, 138, and 139 including the output level of the test signal, a measured value of the throughput, and a determination result of whether or not the measured value exceeds a threshold value, as display items, and the measurement situation display control unit 18*d* updates and display values of the respective items 136, 138, and 139 of the EIS measurement situation display area 13*d* in accordance with the progress of the reception sensitivity test.

With the configuration, the measuring device 1 according to the present embodiment can easily confirm the output level of the test signal displayed in the EIS measurement situation display area 13*d* during the reception sensitivity test related to the equivalent isotropic sensitivity measurement at each measurement position, the measured value of the throughput, and the determination result of whether or not the measured value of the throughput exceeds a threshold value.

Further, in the measuring device 1 according to the present embodiment, the EIS-CDF measurement situation display area 13*c* includes a rotation angle of the positioner corresponding to a plurality of the measurement positions and the result of the reception sensitivity test at the measurement position, as display items (131, 132, 133), and the measurement situation display control unit 18*d* displays, as the measurement result of the reception sensitivity test, an output level of the test signal immediately before the output level of the test signal which is displayed in a display area of the EIS measurement situation display area 13*d* and is determined that the measured value of the throughput exceeds the threshold value.

With the configuration, the measuring device 1 according to the present embodiment can continuously confirm the measurement progress situation from the display content of each item 131, 132, or 133 in the EIS-CDF measurement situation display area 13*c* until the DUT 100 cannot receive the test signal having the lower output level during the reception sensitivity test related to the equivalent isotropic sensitivity measurement at each measurement position.

Further, in the measuring device 1 according to the present embodiment, the test signal is any of linear polarizations orthogonal to each other, the plurality of orientations are all orientations which are necessary to calculate a cumulative distribution function (CDF) of an equivalent isotropic sensitivity (EIS) of the DUT 100, the EIS-CDF measurement situation display area 13*c* includes a rotation angle of the positioner corresponding to the measurement position of a measurement target of cumulative distribution measurement and the equivalent isotropic sensitivity at the measurement position as display items 131, 132, and 133, and the equivalent isotropic sensitivity is displayed as a result of the reception sensitivity test in the EIS-CDF measurement situation display area 13*c*.

With the configuration, the measuring device 1 according to the present embodiment can confirm the progress situation of CDF measurement for each measurement position in EIS measurement.

Further, in the measuring device 1 according to the present embodiment, the EIS measurement situation display area 13*d* further displays an item which indicates the test signal included in any of the linear polarizations orthogonal to each other. With the configuration, the measuring device 1 according to the present embodiment can confirm the progress situation of the CDF measurement for each measurement position in the EIS measurement, for example, for any of the $\theta$ polarization and the $\varphi$ polarization as linearly polarizations orthogonal to each other.

Further, a mobile terminal testing method according to the present embodiment is a mobile terminal testing method of the measuring device 1 including a positioner (DUT scanning mechanism 56) that is provide in an internal space 51 of a n OTA chamber 50 and rotates a DUT 100 to sequentially face all preset orientations of a spherical coordinate system; an NR system simulator 20 that is connected to a test antenna 5 in the internal space 51; an integrated control device 10 that controls the NR system simulator 20 to perform, at each measurement position corresponding to the plurality of orientations, a reception sensitivity test for transmitting a test signal from the test antenna 5 to the DUT 100 in accordance with rotation of the positioner, receiving a signal under measurement transmitted from the DUT 100 which has received the test signal by the test antenna 5, measuring a throughput based on the signal under measurement, and repeating the measurement of the throughput while changing an output level of the test signal, the mobile terminal testing method including: an initial screen display control step (S3) of displaying, in accordance with a start of the reception sensitivity test at each measurement position, an initial screen of a measurement progress display screen 13a having an EIS-CDF measurement situation display area 13c for displaying a result of the reception sensitivity test up to the measurement position where the reception sensitivity test is completed, and an EIS measurement situation display area 13d for displaying a measurement progress situation of the reception sensitivity test at the measurement position where the reception sensitivity test is started; a measurement position situation display step (S48) of displaying the result of the reception sensitivity test up to the measurement position where the reception sensitivity test is completed in the EIS-CDF measurement situation display area 13c in accordance with the progress of the reception sensitivity test at each measurement position; a reception sensitivity test situation display step (S43, S45, S46, S47) of displaying the progress situation of the measurement of the reception sensitivity test at the measurement position where the reception sensitivity test is started in the EIS measurement situation display area 13d.

With the configuration, the mobile terminal testing method according to the present embodiment can grasp the progress situation of the reception sensitivity test, which indicates a signal level that can be normally received by the DUT 100 during the reception sensitivity test at each measurement position from the display content of the EIS measurement situation display area 13d. As a result, it is possible to confirm the progress situation of the measurement in the reception sensitivity test for each of a plurality of measurement positions such as the EIS-CDF measurement, and it is possible to eliminate uncertainty related to the progress of the measurement. Furthermore, it is possible to find a cause or ascertain whether or not to perform a test again in a case where abnormality occurs, so that it is possible to estimate a test time.

INDUSTRIAL APPLICABILITY

As described above, the mobile terminal testing device and the mobile terminal testing method according to the present invention is useful for a mobile terminal testing device and a mobile terminal testing method that have advantages of confirming a progress situation of a reception sensitivity test performed at each of a plurality of measurement positions as in EIS-CDF measurement, eliminating uncertainties related to the progress of the measurement, finding a cause or ascertain whether or not to perform a test again in a case where the progress is abnormal, and estimating a test time, and that perform a reception sensitivity test related to EIS-CDF measurement on a mobile terminal, such as a 5G wireless terminal, which has a high-speed communication capacity.

DESCRIPTION OF REFERENCE NUMERALS AND SIGNS

1: Measuring device (mobile terminal testing device)
5: Test antenna
10: Integrated control device (measurement control means)
13: Display unit
13a: Measurement progress display screen
13c: EIS-CDF measurement situation display area (first display area)
13d: EIS measurement situation display area (second display area)
18: Reception sensitivity test control unit
18d: Measurement situation display control unit (display control means)
20: NR system simulator (simulation measurement device)
50: OTA chamber (radio anechoic box)
51: Internal space
56: DUT scanning mechanism (positioner)
100: DUT (Device Under Test, mobile terminal)
131, 132, 133: Display item (item) of EIS-CDF measurement situation display area
136, 138, 139: Display item (item) of EIS measurement situation display area

What is claimed is:

1. A mobile terminal testing device comprising:
a positioner that rotates a mobile terminal which is a device under test to sequentially face a plurality of preset orientations of a spherical coordinate system;
a simulation measurement device that is connected to a test antenna;
measurement control means for controlling the simulation measurement device to perform, at each measurement position corresponding to the plurality of orientations, a reception sensitivity test for transmitting a test signal from the test antenna to the mobile terminal in accordance with rotation of the positioner, receiving a signal under measurement transmitted from the mobile terminal which has received the test signal by the test antenna, measuring a throughput based on the signal under measurement, and repeating the measurement of the throughput while changing an output level of the test signal; and
display control means for displaying, in accordance with a progress of the reception sensitivity test at each measurement position, a measurement progress display screen having a first display area for displaying a result of the reception sensitivity test up to the measurement position where the reception sensitivity test is completed, and a second display area for displaying a measurement progress situation of the reception sensitivity test at the measurement position where the reception sensitivity test is started.

2. The mobile terminal testing device according to claim 1, wherein
the second display area includes respective items including the output level of the test signal, a measured value of the throughput, and a determination result of whether or not the measured value exceeds a threshold value, as display items, and
the display control means updates and displays values of the respective items in the second display area in accordance with the progress of the reception sensitivity test.

3. The mobile terminal testing device according to claim 1, wherein
the first display area includes a rotation angle of the positioner corresponding to a plurality of the measurement positions and the result of the reception sensitivity test at the measurement position, as display items, and
the display control means displays, as the result of the reception sensitivity test, an output level of the test signal immediately before the output level of the test signal which is displayed in the second display area and is determined that a measured value of the throughput exceeds a threshold value.

4. The mobile terminal testing device according to claim 1, wherein the test signal is any of linear polarizations orthogonal to each other, the plurality of orientations are all orientations which are necessary to calculate a cumulative distribution function (CDF) of an equivalent isotropic sensitivity (EIS) of the mobile terminal, and the first display area includes a rotation angle of the positioner corresponding to the measurement position of a measurement target of cumulative distribution measurement and the equivalent isotropic sensitivity at the measurement position as display items, and the equivalent isotropic sensitivity is displayed as a result of the reception sensitivity test in the first display area.

5. The mobile terminal testing device according to claim 4, wherein the second display area further displays an item which indicates the test signal included in any of the linear polarizations orthogonal to each other.

6. The mobile terminal testing device according to claim 1, further comprising:

a radio anechoic box including an internal space, wherein the positioner and the test antenna are provided in the internal space.

7. A mobile terminal testing method of a mobile terminal testing device including a positioner that rotates a mobile terminal which is a device under test to sequentially face a plurality of preset orientations of a spherical coordinate system, a simulation measurement device that is connected to a test antenna, and a measurement control means for controlling the simulation measurement device to perform, at each measurement position corresponding to the plurality of orientations, a reception sensitivity test for transmitting a test signal from the test antenna to the mobile terminal in accordance with rotation of the positioner, receiving a signal under measurement transmitted from the mobile terminal which has received the test signal by the test antenna, measuring a throughput based on the signal under measurement, and repeating the measurement of the throughput while changing an output level of the test signal, the mobile terminal testing method comprising:

an initial screen display control step of displaying, in accordance with a start of the reception sensitivity test at each measurement position, an initial screen of a measurement progress display screen having a first display area for displaying a result of the reception sensitivity test up to the measurement position where the reception sensitivity test is completed, and a second display area for displaying a measurement progress situation of the reception sensitivity test at the measurement position where the reception sensitivity test is started;

a measurement position situation display step of displaying the result of the reception sensitivity test up to the measurement position where the reception sensitivity test is completed in the first display area in accordance with the progress of the reception sensitivity test at each measurement position; and a reception sensitivity test situation display step of displaying the progress situation of the measurement of the reception sensitivity test at the measurement position where the reception sensitivity test is started in the second display area.

* * * * *